United States Patent
Liu et al.

(10) Patent No.: US 12,037,555 B2
(45) Date of Patent: Jul. 16, 2024

(54) BIOMASS FUEL SLURRY AND METHOD OF MAKING THE SAME

(71) Applicant: University of Kentucky Research Foundation, Lexington, KY (US)

(72) Inventors: Kunlei Liu, Lexington, KY (US); Heather Nikolic, Stamping Ground, KY (US)

(73) Assignee: University of Kentucky Research Foundation, Lexington, KY (US)

( * ) Notice: Subject to any disclaimer, the term of this patent is extended or adjusted under 35 U.S.C. 154(b) by 0 days.

(21) Appl. No.: 17/879,370

(22) Filed: Aug. 2, 2022

(65) Prior Publication Data
US 2023/0047581 A1 Feb. 16, 2023

Related U.S. Application Data

(60) Provisional application No. 63/228,487, filed on Aug. 2, 2021.

(51) Int. Cl.
*C10L 1/32* (2006.01)

(52) U.S. Cl.
CPC ........ *C10L 1/328* (2013.01); *C10L 2200/0461* (2013.01); *C10L 2200/0469* (2013.01)

(58) Field of Classification Search
CPC ............. C10L 1/328; C10L 2200/0461; C10L 2200/0469; C10L 2250/04; C10L 2250/06; C10L 1/326; C10L 5/02; C10L 5/04; C10L 5/06; C10L 5/44; C10L 5/406; C10L 5/40; C10L 5/442; C10L 5/445; C10L 5/447; Y02E 50/10; Y02E 50/30
See application file for complete search history.

(56) References Cited

U.S. PATENT DOCUMENTS 8,118,894 B2    2/2012   Norbeck et al.

FOREIGN PATENT DOCUMENTS

WO    WO-2010039264 A1 *   4/2010   .............. C10J 3/466

OTHER PUBLICATIONS

Alli, R.D. "Simulation of Waste Plastic Gasification and Thermogravimetric Analysis of Waste Plastic in CO2 Atmosphere." The Petroleum Institute, Jun. 2016.
Yang, R-X., et al. "Carbon nanotube and hydrogen production from waste plastic gasification over Ni/Al-SBA-15 catalysts: effect of aluminum content." RSC Adv., 2016, 6, 40731.
Bian, C., et al. "Hydrogen/Methane Production from Supercritical Water Gasification of Lignite Coal with Plastic Waste Blends." Energy Fuels 2020, 34, 11165-11174.
Castro-Marcano, F., et al. "Constitution of Illinois No. 6 Argonne Premium Coal: A Review." Energy Fuels 2011, 25, 845-853.
Coal and Biomass to Liquids (CBTL) Greenhouse Gas Optimization Tool Documentation, Mar. 11, 2015.

(Continued)

*Primary Examiner* — Taiwo Oladapo
(74) *Attorney, Agent, or Firm* — Stites & Harbison PLLC; Warren D. Schickli

(57) ABSTRACT

A biomass fuel slurry includes a mixture of a biomass material and a plastic material suspended in water. In other embodiments, the biomass fuel slurry also includes coal. A method of making a biomass fuel slurry includes the steps of encapsulating a biomass material with a plastic material to produce a plastic encapsulated biomass material and suspending the plastic encapsulated biomass material in water.

19 Claims, 1 Drawing Sheet

(56) References Cited

OTHER PUBLICATIONS

Biomass Energy Data Book, Edition 4. U.S. Department of Energy, Energy Efficiency & Renewable Energy, 2011.

Hardesty, B.D., et al. "We estimate up to 14 million tonnes of microplastics lie on the seafloor. It's worse than we thought." CSIRO 2020.

JCF, "Energy Innovation Utilizing Low Rank Coal." JGC Coal Fuel.

Kim, J-W., et al. "Air gasification of mixed plastic wastes using a two-stage gasifier for the production of producer gas with low tar and a high caloric value." Fuel 90 (2011) 2266-2272.

Lee, J.W., et al. "Gasification of Mixed Plastic Wastes in a Moving-Grate Gasifier and Application of the Producer Gas to a Power Generation Engine." Energy Fuels 2013, 27, 2092-2098.

Margolin, J.A., et al. "Test Standards for Contingency Base Waste-to-Energy Technologies." US Army Research Laboratory, 2015.

Martinez-Lera, S., et al. "Design and first experimental results of a bubbling fluidized bed for air gasification of plastic waste." J Mater Cycles Waste Manag (2013) 15:370-380.

Mastellone, M.L., et al. "Olivine as a Tar Removal Catalyst During Fluidized Bed Gasification of Plastic Waste." AIChE Journal, 2008, vol. 54, No. 6.

Mastellone, M.L., et al. "Co-gasification of coal, plastic waste and wood in a bubbling fluidized bed reactor." Fuel 89 (2010) 2991-3000.

Matsunami, J., et al. "Gasification of Waste Tyre and Plastic (PET) by Solar Thermochemical Process for Solar Energy Utilization." Solar Energy vol. 65, No. 1, pp. 21-23, 1999.

Ongen, A., et al. "Methane-rich syngas production by gasification of thermoset waste plastics." Clean Techn Environ Policy (2016) 18:915-924.

Pasternak, A.D., et al. "MSW to Hydrogen." Associate for Information and Image Management.

Pinto, F., et al. "Co-gasification study of biomass mixed with plastic wastes." Fuel 81 (2002) 291-297.

Pinto, F., et al. "Effect of experimental conditions on co-gasification of coal, biomass and plastics wastes with air/steam mixtures in a fluidized bed system." Fuel 82 (2003) 1967-1976.

Saebea, D., et al. "Gasification of plastic waste for synthesis gas production." Energy Reports 6 (2020) 202-207.

Sancho, J.A., et al. "Catalytic Air Gasification of Plastic Waste (Polypropylene) in Fluidized Bed. Part I: Use of in-Gasifier Bed Additives." Ind. Eng. Chem. Res. 2008, 47, 1005-1010.

Tillman, D.A., et al. "Solid Fuel Blending. Principles, Practices, and Problems." Butterworth-Heinemann.

Takagi, K., et al. "Novel Gasification Process of Waste Plastics by Using By-product Gas Generated in Steelmaking Process." Journal of the Japan Institute of Energy, 92, 1167-1172 (2013).

Toledo, J.M., et al. "Catalytic Air Gasification of Plastic Waste (Polypropylene) in a Fluidized Bed. Part II: Effects of Some Operating Variables on the Quality of the Raw Gas Produced Using Olivine as the In-Bed Material." Ind. Eng. Chem. Res. 2011, 50, 11815-11821.

Tumulura, J.S. "Comparison of Chemical Composition and Energy Property of Torrefied Switchgrass and Corn Stover." Front. Energy Res. 3;46, 2015.

Wu, S-L., et al. "Design of catalysts comprising a nickel core and ceria shell for hydrogen production from plastic waste gasification: an integrated test for anti-coking and catalytic performance." Catal. Sci. Technol., 2020, 10, 3975.

Wu, C., et al. "Pyrolysis-gasification of plastics, mixed plastics and real-world plastic waste with and without Ni—Mg—Al catalyst." Fuel 89 (2010) 3022-3032.

Wu, C., et al. "Pyrolysis-gasification of post-consumer municipal solid plastic waste for hydrogen production." International Journal of Hydrogen Energy 35 (2010) 949-957.

Xiao, R., et al. "Air gasification of polypropylene plastic waste in fluidized bed gasifier." Energy Conversion and Management 48 (2007) 778-786.

Yang, R-X., et al. "Effects of Nickel Species on Ni/Al2O3 Catalysts in Carbon Nanotube and Hydrogen Production by Waste Plastic Gasification: Bench- and Pilot-Scale Tests." Energy Fuels 2015, 29, 8178-8187.

Yang, R-X., et al. "Effects of Temperature and Equivalence Ratio on Carbon Nanotubes and Hydrogen Production from Waste Plastic Gasification in Fluidized Bed." Energy Fuels 2018, 32, 5462-5470.

Zaccariello, L., et al. "Fluidized-Bed Gasification of Plastic Waste, Wood, and Their Blends with Coal." Energies 2015, 8, 8052-8068.

Acomb, J.C., et al. "Control of steam input to the pyrolysis-gasification of waste plastics for improved production of hydrogen or carbon nanotubes." Applied Catalysis B: Environmental 147 (2014) 571-584.

\* cited by examiner

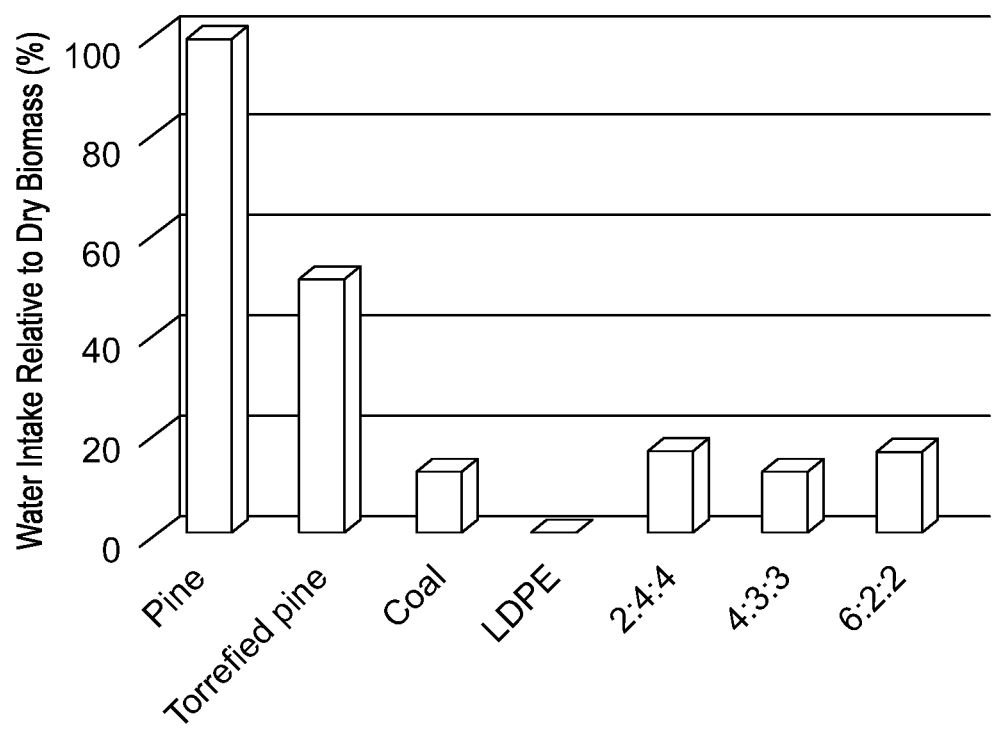

BIOMASS FUEL SLURRY AND METHOD OF MAKING THE SAME

RELATED APPLICATIONS

This application claims priority to U.S. provisional patent application Ser. No. 63/228,487, filed on Aug. 2, 2021, the full disclosure of which is incorporated herein by reference.

GOVERNMENT SUPPORT

This invention was made with government support under Grant No. DE FOA-0001989 awarded by the U. S. Department of Energy, National Energy Technology Laboratory. The government has certain rights in the invention.

TECHNICAL FIELD

This document relates generally to the conversion of solid fuels to syngas and, more particularly, to a new and improved biomass fuel slurry as well as to a new and improved method of making that biomass fuel slurry.

BACKGROUND

Gasification is the conversion of carbon-contained fuels to syngas (CO and hydrogen). With additional processing hydrogen, liquid hydrocarbons, power and heat are common end-use valuable products. Inclusion of biomass, as a renewable carbon source, has been drawing much attention for carbon-neutral or near-carbon-neutral gasification. Unfortunately, challenges exist when applying biomass because of its low volumetric energy density, high moisture content and high water uptake character. The heating value of biomass is significantly lower than that of coal limiting the amount of biomass in blended biomass-coal fuel.

Additionally, a huge amount of carbonaceous plastic waste has been generated in the last half-century when industrial production became available. Dealing with these nearly non-degradable wastes include the options of landfill and simply burning for either gasification or power generation. The pyrolysis and gasification of low density polyethylene (LDPE), polyethylene (PE), polypropylene (PP), and polystyrene (PS) as well as thermoset waste plastics has a heating value similar to that of coal. The inclusion of carbonaceous mixed plastics in gasification is attractive to (a) reuse the waste for beneficially increasing the heating value of the final blended solid fuel and (b) significantly reduce the disposal volume.

The main challenges for burning plastic waste used for gasification and power generation are inconsistent quality of feedstock, inefficient and hence costly pre-sorting requirement, non-existent markets citing lack of standardized products, and operational problems due to softened/molten material at feed port and excessive tar production. Of course, when utilizing very abundant waste materials, of which biomass and waste plastic are, using the maximum amount of the material is desirable.

There are two main approaches to make biomass ready for large quantity transport and utilization: torrefaction and steam explosion. Torrefaction is a thermochemical treatment of biomass at 200-320° C. It is carried out under atmospheric pressure and in the absence of oxygen (with no air). During the torrefaction process, the water contained in the biomass along with superfluous volatiles are released. The final product is the remaining solid, dry, blackened material, called bio-char[1]. After torrefaction, the biomass typically loses 20% of its mass (bone dry basis) and 10% of its heating value, with no appreciable change in volume. Typically, the bio-char is further densified, usually into briquettes or pellets using conventional densification equipment such as twin screw, to increase its mass and energy density and to improve its hydrophobic properties. The final torrefied biomass product may repel water but UK CAER has demonstrated that torrefied wood intakes water due to surface hydroxyl groups and the capillary effect of micropores present in the material.

Steam explosion is a process in which biomass is treated with hot steam at 180-240° C. and under pressure of 1-3.5 MPa, followed by an explosive decompression of the biomass that results in a rupture of the rigid fiber structure. Depending on residence time and temperature, steam explosion can result in anything from small cracks in the wood structure, to total defibrillation of the wood fibers. It has been used for the pre-treatment of wood prior to pelletization to increase heating value, bonding properties and hydrophobicity of the wood.

As illustrated in Table 1, compared to coal, even though the pelletized biomass after torrefaction or steam explosion, has an energy density, 18-20 GJ/m$^3$, that is nearly double that for raw biomass, 10-11 GJ/m$^3$, it is still 10-12 GJ/m$^3$ below the heating value of IL #6 coal. Brunauer-Emmet-Teller (BET) analysis reveals that the pore volume (porosity) of biomass pellets is much larger than that of IL #6 coal. The high surface area and large quantity of micropores in the biomass pellets are also included Table 1.

TABLE 1

General Properties of Coal and Processed Biomass.

| Material | Bulk Density (kg/m$^3$) | Heating Value (Btu/lb) | Heating Value (GJ/m) | BET Surface Area (m$^2$/g) | Porosity (%) | Pore Volume. (cm$^3$/g) | Average Pore Size (nm) |
|---|---|---|---|---|---|---|---|
| IL #6 Coal | 670-920[2] | 11,666-13,125[3] | 28-31 | <29[4] | — | <0.01[5,6] | 0.6-1[6] |
| Torrefied Pine Wood | 150-350[7,8] | 9,203-10,340[5] | 18-20 | >40[9,10] | ~65[12] | ~0.1[11] | 30-100[14] |
| Steam Exploded Pine Wood | 40-200[12,13] | 8,000-9,800[14,15] | 3-14 | 65-130[16] | ~80[18] | 0.3-1.1[17] | 500-1000[18] |

Significantly, the high water uptake by porous pretreated biomass containing hydroxyl groups during the conventional slurry preparation results in a highly viscous, unpumpable slurry when the solid content in the slurry is more than 40%. To mitigate the water uptake problem while densifying the biomass, two approaches can be taken (1)

reduction of porosity (pore volume) and hygroscopicity of the biomass mixed with hydrophobic materials, and (2) the enhancement of hydrophobicity of the biomass utilizing thermoplastics.

This document relates to a new and improved biomass fuel slurry including a biomass material and a waste plastic material with or without coal, as well as to a method of making that biomass fuel slurry. The biomass material is encapsulated in a thin layer of plastic which results in reduced water uptake during slurry preparation which, in turn, allows for the production of a pumpable biomass fuel slurry useful in gasification to synfuel.

SUMMARY

In accordance with the purposes and benefits described herein, a new and improved biomass fuel slurry comprises, consists essentially of or consists of a mixture of a biomass material and a plastic material suspended in water. The biomass material of the mixture is encapsulated in a thin layer of the plastic. This advantageously closes the pores, reducing the effective pore volume and results in reduced water uptake by the biomass during slurry preparation.

The biomass fuel slurry may have a plastic/biomass mass ratio of between 3:1 to 1:4. In other embodiments, the biomass fuel slurry may have a plastic/biomass mass ratio of between 2:1 to 1:4. In still other embodiments, the biomass fuel slurry may have a plastic/biomass mass ratio of between 1:1 to 1:4. In yet other additional embodiments, the biomass fuel slurry may have a plastic/biomass mass ratio of between 1:2 to 1:4.

The plastic material in the biomass fuel slurry may be a waste plastic material. That waste plastic material may be selected from a group of waste plastic materials consisting of polyethylene, high density polyethylene, polyvinyl chloride, low density polyethylene, polypropylene, polystyrene, polycarbonate, polyethylene terephthalate, acrylic, nylon, bioplastic, composites and combinations thereof.

The biomass material may be selected from a group consisting of raw biomass materials, biomass materials subjected to torrefaction, biomass materials subjected to steam explosion, wood, switchgrass, hemp, kenaf, agriculture residues, forest residues and combinations thereof.

In at least some embodiments, the biomass fuel slurry includes between about 15-25% by heat input of biomass material in the fuel slurry. More particularly, the biomass fuel slurry may include about 20% by heat input of biomass material.

In one or more of the many possible embodiments, the biomass fuel slurry further includes coal. In such embodiments, the biomass fuel slurry may have a plastic/biomass/coal mass ratio of between 1/3.5/10.5 to 1/4/11.3. Still further, the biomass fuel slurry may have 45-65% total solids by weight. In some embodiments, the biomass fuel slurry is about 60% total solids by weight.

In accordance with yet another aspect, a method of making a biomass fuel slurry is provided. That method comprises the steps of: (a) encapsulating a biomass material with a plastic material to produce a plastic encapsulated biomass material wherein pores in the biomass material are closed by plastic and (b) suspending the plastic encapsulated biomass material in water.

The method may include using a plastic/biomass ratio of between 3:1 to 1:4. The method may include providing between about 15-25% by mass of biomass material in the biomass fuel slurry. The method may include adding coal to the biomass fuel slurry. In some embodiments, the method includes providing the biomass fuel slurry with 45-65% total solids by weight. In some embodiments, the method includes providing the biomass fuel slurry with a plastic/biomass/coal mass ratio of between 1/3.5/10.5 to 1/4/11.3.

In the following description, there are shown and described several preferred embodiments of the biomass fuel slurry and the related method of making the biomass fuel slurry. As it should be realized, the biomass fuel slurry and method are capable of other, different embodiments and their several details are capable of modification in various, obvious aspects all without departing from the biomass fuel slurry and method as set forth and described in the following claims. Accordingly, the drawings and descriptions should be regarded as illustrative in nature and not as restrictive.

BRIEF DESCRIPTION OF THE DRAWING FIGURES

The accompanying drawing FIGURES incorporated herein and forming a part of the specification, illustrate several aspects of the biomass fuel slurry and the method and together with the description serve to explain certain principles thereof.

FIG. 1 is a graph illustrating water uptake relative to dry mass for various materials and biomass/plastic/coal mixtures.

Reference will now be made in detail to the present preferred embodiments of the biomass fuel slurry and the method, examples of which are illustrated in the accompanying drawing FIGURES.

DETAILED DESCRIPTION

A new and improved biomass fuel slurry includes a mixture of a biomass material and a plastic material suspended in water. The mixture of biomass material and plastic material used in the biomass fuel slurry may have a plastic/biomass mass ratio of between 3:1 to 1:4. In other embodiments, the mixture of biomass material and plastic material used in the biomass fuel slurry may have a plastic/biomass mass ratio of between 2:1 to 1:4. In still other embodiments, 1:1 to 1:4 and in yet others, 1:2 to 1:4.

To mitigate the water uptake problem while densifying the biomass, two approaches can be taken (1) reduction of porosity (pore volume) and hygroscopicity of the biomass mixed with hydrophobic materials, and (2) the enhancement of hydrophobicity of the biomass utilizing thermoplastics.

It is known that woody biomass possesses porous structures that are made of complex fibers biochemically containing three organic polymers, i.e., cellulose, hemicellulose, and lignin, in which the lignin acts as the fiber wall to protect both the porous hemicellulose and cellulose. All of these components contain hydroxyl groups that can be easily form a hydrogen bond with water molecules. Under such a condition, it can be envisioned that water can be gradually moved into the fiber via the capillary effect, which is detrimental to the preparation of coal-biomass slurry. In order to minimize the capillary effect while densifying pine wood, the use of mechanical press, such as an extruder to reduce the porosity (or pore volume) of biomass is a common way; however, its effectiveness will be narrowed when pore size (or diameter) is <1 μm.

After densification and porosity reduction, Method 2 may be employed. Utilization of common waste thermoplastics to improve the hydrophobicity of biomass is the second way to significantly reduce the water uptake. For example, a type of thermoplastic, such as polyethylene, containing hydrophobic $(C_2H_4)_n$, can be pre-heated to 239-350° F. as a molten precursor mixed mechanically with biomass to form a composite fuel or briquette by extrusion.

Our preliminary studies, shown in FIG. 1, indicate that a significant reduction (about 8×) of water holding (uptake) capacity was observed by co-processing biomass/plastic and mixing with coal. The water holding capacity of the mixture is close to coal alone. During the experiment, untreated pinewood, torrefied pinewood, coal, LDPE, biomass/plastic/coal mixture at weight ratios of 2:4:4, 4:3:3, and 6:2:2 were tested.

A broad range of thermoplastic and thermosetting plastics may be used as the plastic material in the biomass fuel slurry. The plastics useful in the biomass fuel slurry, include, but are not necessarily limited to, waste plastic material selected from a group of waste plastic materials consisting of polyethylene, high density polyethylene, polyvinyl chloride, low density polyethylene, polypropylene, polystyrene, polycarbonate, polyethylene terephthalate, acrylic, nylon, bioplastic, composites and combinations thereof.

A broad range of biomass materials may be used as the biomass material in the biomass fuel slurry. The biomass materials useful in the biomass fuel slurry include raw biomass materials, biomass materials subjected to torrefaction and biomass materials subjected to steam explosion. This includes biomass materials subjected to both torrefaction and steam explosion. Still more specifically, biomass materials useful in the biomass fuel slurry include, but are not necessarily limited to, wood, switchgrass, hemp, kenaf, agriculture residues, forest residues and combinations thereof.

In at least some embodiments, the biomass fuel slurry includes between about 15-25% by heat input of biomass material. More particularly, the biomass fuel slurry may include about 20% by heat input of biomass material.

Still further, the biomass fuel slurry may further include coal. In such embodiments, the biomass fuel slurry may have a plastic/biomass/coal mass ratio of between 1/3.5/10.5 to 1/4/11.3. Still further, the biomass fuel slurry may have 45-65% total solids by weight. In some embodiments, the biomass fuel slurry of biomass, waste plastic and coal is about 60% total solids by weight.

A related method of making a biomass fuel slurry may be broadly described as including the steps of (a) encapsulating a biomass material with a plastic material to produce a plastic encapsulated biomass material and (b) suspending the plastic encapsulated biomass material in water.

More specifically, the method may include grinding the plastic/waste plastic material and the biomass material to a size of from about 75 to about 425 um particle size used for proven of concept. In the commercial application, the particle size can be up to ¼ inch, e.g. 6350 um. The ground plastic material and biomass material are then blended using mechanical mixing. Heat is applied to melt the plastic material and provide a thin coating of plastic on the biomass material. Co-processing and mixing of the biomass and plastic materials continues until the pores in the biomass materials are covered over and encapsulated in plastic. This closes the pores, reducing the effective pore volume and results in reduced water uptake by the biomass during subsequent slurry preparation. The mixture may then be extruded to produce the plastic encapsulated biomass material.

Biomass materials and plastic materials useful in the method are identified elsewhere in this document. One useful mixed plastic waste is identified in the following table.

TABLE 2

Specification of Mixed Waste Plastics

| Component | Percentage | Melting Point | Heat Content (dry |
|---|---|---|---|
| #1 Polyethylene | 40.0 | >250 | 10,250 |
| #2 High density | 18.0 | 131 | 19,000 |
| #3 Polyvinyl chloride | 5.9 | 177 | 8,250 |
| #4 Low density | 18.0 | 105 to 123 | 12,050 |
| #5 Polypropylene (PP) | 2.0 | 337 | 19,000 |
| #6 Polystyrene (PS) | 12.0 | 217 | 17,800 |
| #7 Other* | 4.1 | 234 | 13,332 |
| Average Mixed Waste | 100 | | 13,240 |

*Polycarbonate, acrylic, nylon, bioplastics, composites, etc.; but assumed to be polycarbonate on heating basis The method may include using a plastic/biomass ratio of between 3:1 to 1:4. The method may include providing between about 15-25% by heat input of biomass material in the biomass fuel slurry. In one particularly useful embodiment about 20% by heat input of biomass is provided in the biomass fuel slurry. The more biomass in the slurry, the lower the carbon emissions and carbon-negative emissions may be achieved.

The method may include adding coal to the biomass fuel slurry. In some embodiments, the method includes providing the biomass fuel slurry with 45-65% total solids by weight. In some embodiments, the method includes providing the biomass fuel slurry with a plastic/biomass/coal mass ratio of between 1/3.5/10.5 to 1/4/11.3.

When blending with coal, the extruded plastic encapsulated biomass material may be ground to a target particle size of about 75-425 um and then blended with coal of about 10-50 um particle size. This may be done in a mill, such as a ball mill. A surfactant, such as Tamol SN or _Daracem 55_ may be added to the mill to aid in the mixing or blending of the plastic encapsulated biomass material and coal. The mixed and sized particles of plastic encapsulated biomass and coal may then be added to a continuously stirred tank with water and surfactant for the preparation of the biomass fuel slurry.

A biomass fuel slurry of about 60% solids could include about 14% biomass, about 4% plastic and about 42% coal. A biomass fuel slurry of about 49% solids could include about 12% biomass, about 3% plastic and about 34% coal. The target viscosity of an acceptable slurry is about ≤1000 cP at a shear rate of 100 $sec^{-1}$. Substantially any type of coal may be used in the biomass fuel slurry. Using different types of coal will affect the slurry composition and the heating.

This disclosure may be considered to relate to the following items:

1. A biomass fuel slurry, comprising:
   a mixture of a biomass material and a plastic material suspended in water.
2. The biomass fuel slurry of item 1, wherein the mixture has a plastic/biomass mass ratio of between 3:1 to 1:4.
3. The biomass fuel slurry of item 1, wherein the mixture has a plastic/biomass mass ratio of between 2:1 to 1:4.
4. The biomass fuel slurry of item 1, wherein the mixture has a plastic/biomass mass ratio of between 1:1 to 1:4.
5. The biomass fuel slurry of item 1, wherein the mixture has a plastic/biomass mass ratio of between 1:2 to 1:4.
6. The biomass fuel slurry of item 1, wherein the plastic material is a waste plastic material.
7. The biomass fuel slurry of item 6, wherein the waste plastic material is selected from a group of waste plastic materials consisting of polyethylene, high density polyethylene, polyvinyl chloride, low density polyethylene, polypropylene, polystyrene, polycarbonate, polyethylene terephthalate, acrylic, nylon, bioplastic, composites and combinations thereof.

8. The biomass fuel slurry of item 7, wherein the biomass material is selected from a group consisting of raw biomass materials, biomass materials subjected to torrefaction, biomass materials subjected to steam explosion, biomass materials subjected to torrefaction and steam explosion, wood, switchgrass, hemp, kenaf, agriculture residues, forest residues and combinations thereof.

9. The biomass fuel slurry of item 1, including between about 15-25% by heat input of biomass material in the biomass fuel slurry.

10. The biomass fuel slurry of item 1, including about 20% by heat input of biomass material in the biomass fuel slurry.

11. The biomass fuel slurry of item 1, further including coal.

12. The biomass fuel slurry of item 11, wherein the biomass fuel slurry is 45-65% total solids by weight.

13. The biomass fuel slurry of item 11, wherein the biomass fuel slurry is about 60% total solids by weight.

14. The biomass fuel slurry of item 13, wherein the biomass fuel slurry has a plastic/biomass/coal mass ratio of between 1/3.5/10.5 and 1/4/11.3.

15. A method of making a biomass fuel slurry, comprising:
encapsulating a biomass material with a plastic material to produce a plastic encapsulated biomass material; and
suspending the plastic encapsulated biomass material in water.

16. The method of item 15, including using a plastic/biomass ratio of between 3:1 to 1:4.

17. The method of item 16, including providing between about 15-25% by heat input of biomass material in the biomass fuel slurry.

18. The method of item 17, including adding coal to the biomass fuel slurry.

19. The method of item 18, including providing the biomass fuel slurry with 45-65% total solids by weight.

20. The method of item 19, including providing the biomass fuel slurry with a plastic/biomass/coal mass ratio of between 1/3.5/10.5 and 1/4/11.3.

Each of the following terms written in singular grammatical form: "a", "an", and "the", as used herein, means "at least one", or "one or more". Use of the phrase "One or more" herein does not alter this intended meaning of "a", "an", or "the". Accordingly, the terms "a", "an", and "the", as used herein, may also refer to, and encompass, a plurality of the stated entity or object, unless otherwise specifically defined or stated herein, or, unless the context clearly dictates otherwise.

Each of the following terms: "includes", "including", "has", "having", "comprises", and "comprising", and, their linguistic/grammatical variants, derivatives, or/and conjugates, as used herein, means "including, but not limited to", and is to be taken as specifying the stated component(s), feature(s), characteristic(s), parameter(s), integer(s), or step(s), and does not preclude addition of one or more additional component(s), feature(s), characteristic(s), parameter(s), integer(s), step(s), or groups thereof.

The phrase "consisting of", as used herein, is closed-ended and excludes any element, step, or ingredient not specifically mentioned. The phrase "consisting essentially of", as used herein, is a semi-closed term indicating that an item is limited to the components specified and those that do not materially affect the basic and novel characteristic(s) of what is specified.

Terms of approximation, such as the terms about, substantially, approximately, etc., as used herein, refers to ±10% of the stated numerical value.

Although the biomass fuel slurry and related method for making that biomass fuel slurry of this disclosure have been illustratively described and presented by way of specific exemplary embodiments, and examples thereof, it is evident that many alternatives, modifications, or/and variations, thereof, will be apparent to those skilled in the art. Accordingly, it is intended that all such alternatives, modifications, or/and variations, fall within the spirit of, and are encompassed by, the broad scope of the appended claims.

What is claimed:
1. A biomass fuel slurry, comprising:
a biomass material encapsulated in a plastic material and suspended in water wherein pores of the biomass material are covered over and encapsulated in the plastic material to reduce effective pore volume and water uptake by the biomass.

2. The biomass fuel slurry of claim 1, wherein the mixture has a plastic/biomass mass ratio of between 3:1 to 1:4.

3. The biomass fuel slurry of claim 1, wherein the mixture has a plastic/biomass mass ratio of between 2:1 to 1:4.

4. The biomass fuel slurry of claim 1, wherein the mixture has a plastic/biomass mass ratio of between 1:1 to 1:4.

5. The biomass fuel slurry of claim 1, wherein the mixture has a plastic/biomass mass ratio of between 1:2 to 1:4.

6. The biomass fuel slurry of claim 1, wherein the plastic material is a waste plastic material.

7. The biomass fuel slurry of claim 6, wherein the waste plastic material is selected from a group of waste plastic materials consisting of polyethylene, high density polyethylene, polyvinyl chloride, low density polyethylene, polypropylene, polystyrene, polycarbonate, polyethylene terephthalate, acrylic, nylon, bioplastic, composites and combinations thereof.

8. The biomass fuel slurry of claim 7, wherein the biomass material is selected from a group consisting of raw biomass materials, biomass materials subjected to torrefaction, biomass materials subjected to steam explosion, biomass materials subjected to torrefaction and steam explosion, wood, switchgrass, hemp, kenaf, agriculture residues, forest residues and combinations thereof.

9. The biomass fuel slurry of claim 1, including between about 15-25% by heat input of biomass material in the biomass fuel slurry.

10. The biomass fuel slurry of claim 1, further including coal.

11. The biomass fuel slurry of claim 10, wherein the biomass fuel slurry is 45-65% total solids by weight.

12. The biomass fuel slurry of claim 10, wherein the biomass fuel slurry is about 60% total solids by weight.

13. The biomass fuel slurry of claim 12, wherein the biomass fuel slurry has a plastic/biomass/coal mass ratio of between 1/3.5/10.5 and 1/4/11.3.

14. A method of making a biomass fuel slurry, comprising:
encapsulating a biomass material with a plastic material to produce a plastic encapsulated biomass material; and
suspending the plastic encapsulated biomass material in water.

15. The method of claim 14, including using a plastic/biomass ratio of between 3:1 to 1:4.

16. The method of claim 15, including providing between about 15-25% by heat input of biomass material in the biomass fuel slurry.

17. The method of claim 16, including adding coal to the biomass fuel slurry.

18. The method of claim 17, including providing the biomass fuel slurry with 45-65% total solids by weight.

19. The method of claim 18, including providing the biomass fuel slurry with a plastic/biomass/coal mass ratio of between 1/3.5/10.5 and 1/4/11.3.

\* \* \* \* \*

UNITED STATES PATENT AND TRADEMARK OFFICE
CERTIFICATE OF CORRECTION

| | | |
|---|---|---|
| PATENT NO. | : 12,037,555 B2 | Page 1 of 1 |
| APPLICATION NO. | : 17/879370 | |
| DATED | : July 16, 2024 | |
| INVENTOR(S) | : Liu et al. | |

It is certified that error appears in the above-identified patent and that said Letters Patent is hereby corrected as shown below:

In the Specification

Replace the second paragraph, which appears on Column 1, with the following:
GOVERNMENT SUPPORT
This invention was made with government support under Grant No. DE-FE0032403 awarded by the U. S. Department of Energy, National Energy Technology Laboratory. The government has certain rights in the invention.

This certificate supersedes the Certificate of Correction issued August 2, 2022.

Signed and Sealed this
Thirtieth Day of September, 2025

John A. Squires
*Director of the United States Patent and Trademark Office*